July 5, 1955

C. W. DENNER 2,712,173

METHOD OF MAKING FINGER RINGS

Filed May 6, 1954

Clifford W. Denner,
Inventor.
Koenig and Pope,
Attorneys.

July 5, 1955  C. W. DENNER  2,712,173
METHOD OF MAKING FINGER RINGS
Filed May 6, 1954                                2 Sheets-Sheet 2

Clifford W. Denner,
Inventor.
Koenig and Pope,
Attorneys.

United States Patent Office 2,712,173
Patented July 5, 1955

2,712,173
METHOD OF MAKING FINGER RINGS
Clifford W. Denner, Jennings, Mo.
Application May 6, 1954, Serial No. 428,065
4 Claims. (Cl. 29—160.6)

This invention relates to finger rings, and more particularly to the rebuilding of old wedding bands into new style wedding rings.

It is often desired to rebuild an old plain wedding band into a new wedding ring of more ornamental character, such as a diamond wedding ring, preserving the original band as part of the new ring because of the sentiment involved and in many instances because of engraving on the inside of the original band. Among the several objects of this invention may be noted the provision of a practical method for rebuilding a band into a new style ring which preserves the original band in the new ring with the inside of the band exposed at the inside of the new ring so that any engraving thereon may be seen; the provision of a method such as described according to which the original band is encased in a shell which may be of a different metal from the original band and which may incorporate gem settings; and the provision of rings so rebuilt from original bands. Other objects and features will be in part apparent and in part pointed out hereinafter.

The invention accordingly comprises the constructions and methods hereinafter described, the scope of the invention being indicated in the following claims.

In the accompanying drawings, in which several of various possible embodiments of the invention are illustrated, Fig. 1 is a horizontal cross section showing the casting in a mold box of a master mold used in carrying out the invention, the section being taken on line 1—1 of Fig. 2;

Corresponding reference characters indicate corresponding parts throughout the several views of the drawings.

Figure 1:
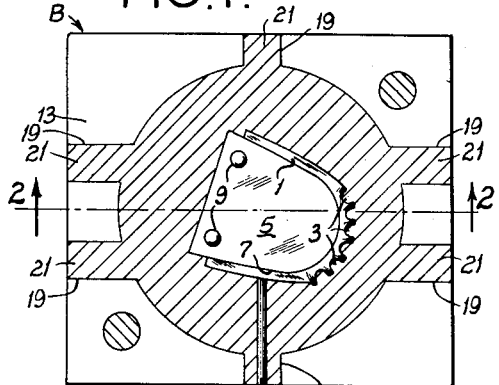

Referring to the drawings, there is indicated at 1 in Fig. 1 a master pattern for shells in which old wedding bands are to be encased. This master pattern may itself consist of a wedding ring which is split open and bent to U-shape. The master pattern 1 shown herein is formed for setting diamonds as indicated at 3. At 5 is indicated a flat core, a portion 7 of the rim of the core corresponding in outline to the U-shape of the master pattern 1. The core consists of a piece of metal plate having a thickness determined by considerations to be made clear later. The portion 7 of the rim of the core is adapted for face-to-face engagement with the inside face of the master pattern 1. The core 5 may be provided with recesses as indicated at 9, although this is not essential.

Figure 2:
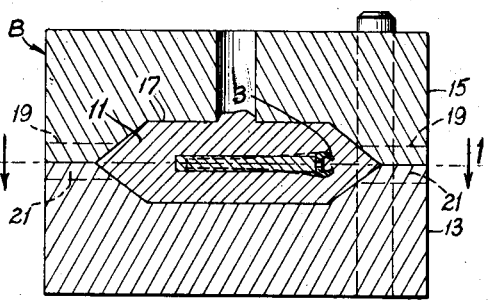
Fig. 2 is a vertical cross section taken on line 2—2 of Fig. 1.

The master pattern 1 is fitted on the rim portion 7 of the core 5 and a permanent master mold 11 is cast around the pattern-core assembly in a two-part mold box B. The parts of the box are designated 13 and 15. The mold 11 is preferably cast of bismuth metal. Figs. 1 and 2 show the mold 11 as it is cast around the pattern-core assembly. The box B has a cavity 17 in which the mold 11 is formed, and a plurality of lateral holes 19 which result in the formation on the mold 11 of projections 21. One of these projections 21 is formed with a gate 23.

Figure 3:
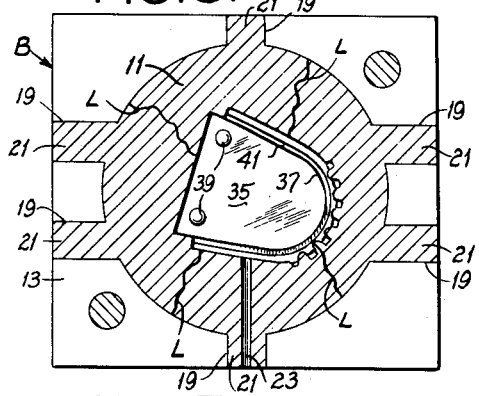
Figs. 3 and 4 are views corresponding to Figs. 1 and 2, illustrating further steps in the procedure of the invention.
Figure 4:
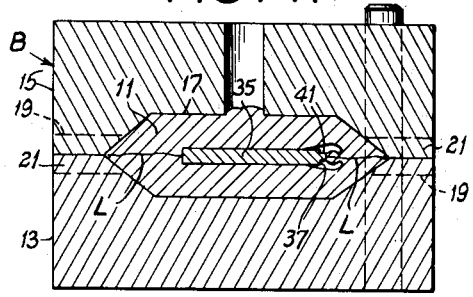

After the master mold 11 has been cast as above described, it is removed from the box B by separating parts 13 and 15, and broken into pieces for removal of the master pattern 1 and core 5 without damaging the pattern formed thereby in the mold. It will be understood that the cavity in the mold 11 resulting from the casting of metal around the assembly 1, 5 will have a peripheral form corresponding to the form of the master pattern 1, and a flat top and bottom where the molding metal contacted the top and bottom of the core 5. After removal of the pattern 1 and core 5, the mold pieces may be reassembled in the box B, as illustrated in Figs. 3 and 4, projections 21 then being useful for properly fitting the pieces together. Typical break lines for the mold 11 are indicated at L in Figs. 3 and 4.

Figure 5:
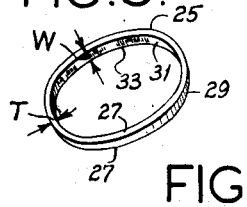
Fig. 5 is a perspective view showing an original wedding band prepared in accordance with the procedure.
Figure 6:
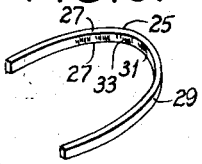
Fig. 6 is a perspective view showing the Fig. 5 band split open and bent to U-shape.

An original wedding band will usually have to be turned in a lathe to reduce its width and thickness and to make it of uniform cross section throughout its length. Fig. 5 illustrates an original wedding band 25 which has been turned so that its sides 27 are parallel, and so that its outer periphery 29 is concentric with its inside 31. This establishes a constant thickness for the band. Fig. 5 shows the inside of the band with engraving, as indicated at 33. In turning the band, care is taken not to reduce its width to the point where any of the engraving is cut away. After turning, the band is split open and spread out to U-shape as shown in Fig. 6.

Returning now to Figs. 3 and 4, these show the master mold 11 reconstituted in the box B with a core 35 in the mold cavity. This core 35 is shaped like the core 5, having a rim portion 37 corresponding in outline to the rim portion 7 of core 5, and recesses 39 corresponding to recesses 9, and also having a ridge 41 extending around its rim portion 37. The width of this ridge 41 corresponds to the width W (see Fig. 5) of the turned-down wedding band 25. The height of the ridge corresponds to the thickness T (see Fig. 5) of the turned-down wedding band, and this is less than the minimum thickness of the master pattern 1. Here it will be clear that the criterion for the thickness of core 5 is that it be thicker than the width of the turned band 25.

Figure 7:
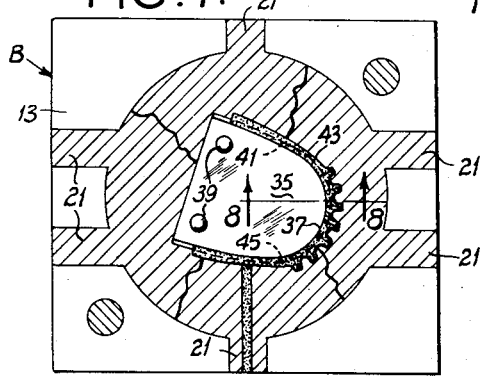
Fig. 7 is a view corresponding to Fig. 3, showing a further step in the procedure involving the molding of a wax pattern in the master mold.
Figure 8:
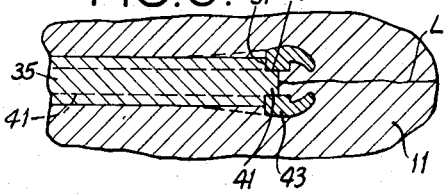
Fig. 8 is an enlarged fragmentary cross section taken on line 8—8 of Fig. 7.

As shown in Figs. 7 and 8, wax is forced into the master mold 11 having the core 35 therein through the gate 23 to form a wax pattern 43 in the mold. It will be seen that the shape of this wax pattern corresponds to the shape of the original master pattern 1 with the additional feature of having a groove 45 on the inside thereof, this groove having a width corresponding to the width of the turned-down band 25, and a height corresponding to the thickness T of the turned-down band.

Figure 9:
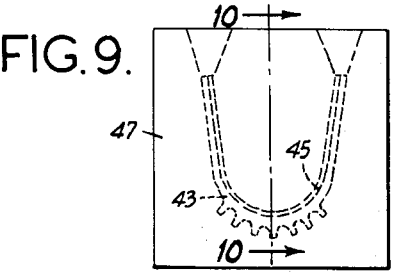
Fig. 9 is a view illustrating a further step in the procedure involving the formation of an investment mold around the wax pattern of Figs. 7 and 8.
Figure 10:
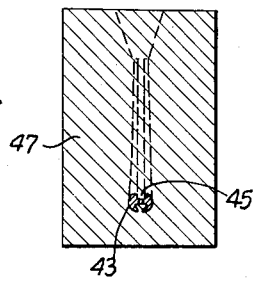
Fig. 10 is a cross section taken on line 10—10 of Fig. 9.
Figure 11:
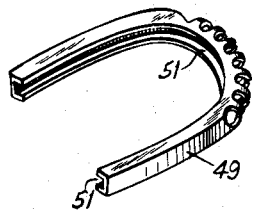
Fig. 11 is a perspective view of a shell cast in the investment mold of Figs. 9 and 10.
Figure 12:
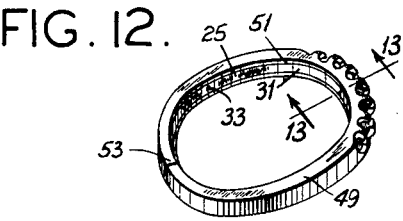
Fig. 12 is a perspective view showing the original band encased in the shell and restored to ring shape.
Figure 13:
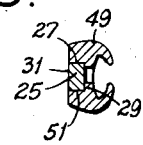
Fig. 13 is a cross section taken on line 13—13 of Fig. 12.

The mold 11 is then removed from box B and its pieces separated for removal of the core 35 and the wax pattern 45. The wax pattern is then placed in a flask (not shown) and an investment mold 47 is cast around the wax pattern. This investment mold is illustrated in Figs. 9 and 10. After the investment material has solidified, the wax is melted out, and the mold is baked. Then, precious metal, which may be different from that of the original band, is poured into the investment mold to form a precious metal shell 49 therein. This shell 49 has the same form as the wax pattern 45, thereby corresponding to the master pattern 1 with a groove 51 on the inside having a width corresponding to the width W of the turned-down band 25, and a height corresponding to the thickness T of the band. The shell 49 is shown per se in Fig. 11. The split-open band 25 shown in Fig. 6 is inserted in the groove 51 in the shell 49, and the two parts bonded together as by solder. Then the resultant U-shaped assembly is bent to form a ring as illustrated in Fig. 12, the ends of the U-shape being bonded together at 53 as by solder. Fig. 13 illustrates how the band 25 is encased in the shell 49. Fig. 12 illustrates how the inside of the band 25 is exposed, so that the engraving 33 thereon may be seen.

It will be understood that there may be relatively wide variations in the width and thickness of wedding bands which may be delivered to the jeweler for rebuilding, and that as a practical matter all bands cannot be turned to the same width and thickness. It is accordingly a feature of the invention to provide a set of cores 35 having ridges 39 of different width and height to take care of the differing requirements resulting from the variations in wedding bands.

Figure 14:
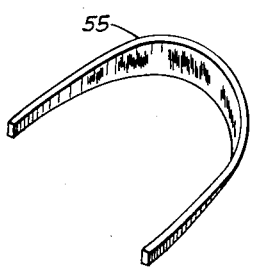
Fig. 14 is a view like Fig. 6, but showing a band which is not uniform in cross section throughout its extent.
Figure 15:
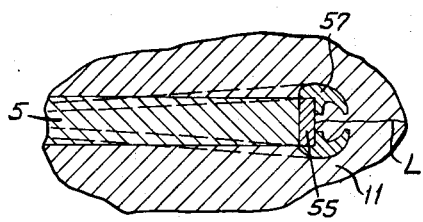
Fig. 15 is a view like Fig. 8 showing the molding of a wax pattern around an assembly of the Fig. 14 band and a core; and, Fig. 16 is a perspective view of a shell cast in an investment mold made from the Fig. 15 wax pattern.
Figure 16:
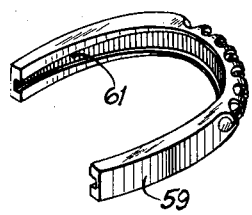

In many instances, an original wedding band is of varying cross section throughout its extent, and it is not possible to turn it to be of uniform cross section without destroying its identity or engraving. Under such circumstances, instead of using a core 35 with an integral ridge in the casting of the wax pattern, the original band is turned only to reduce its thickness (but not its width), then split and bent to U-shape. Fig. 14 shows such a band, designated 55, after the turning, splitting and bending operations. In order to cast a shell having a groove of the form required to receive the band 55, the band itself is used as a pattern for the groove. For this purpose, the band 55 is fitted on the core 5 (which does not have a ridge), the assembly is placed in the master mold 11, and a wax pattern is cast in the mold around the band-core assembly as illustrated in Fig. 15. It will be understood that this corresponds to the step illustrated in Figs. 7 and 8 with the exception that the band-core assembly is used instead of the ridged core 35. The resultant wax pattern 57 (see Fig. 15) has an inside groove corresponding to the band 55. An investment mold is made around the wax pattern as previously described, and a shell 59 (see Fig. 16) is cast in the investment mold. This shell has the same form as the wax pattern and thus has an inside groove 61 corresponding to the band 55. The band 55 is inserted in the groove 61, the two parts bonded together, and the resultant U-shaped assembly is bent to form a ring and its ends are bonded together as previously described.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

I claim:

1. The method of rebuilding a wedding band into a different style ring comprising the steps of forming a master mold having a cavity therein, a portion of the periphery of the cavity being of U-shape and having a form corresponding to said style, inserting a core in the mold having a ridge around its rim with the ridge spaced from said portion of the periphery of the cavity, casting a wax pattern in the mold cavity around the core, said pattern having an inside groove corresponding to the ridge, forming an investment mold around the wax pattern, melting the wax from the investment mold, casting a U-shaped metal shell in the investment mold, said shell incorporating said style and having a groove on the inside corresponding to the ridge, splitting the band and bending it to U-shape corresponding to the shape of the shell, fitting the band in the groove in the shell and bonding it to the shell in the groove, and bending the resultant shell-band assembly to ring shape and bonding its ends together.

2. The method of rebuilding a wedding band into a different style ring comprising the steps of forming a master mold having a cavity therein, a portion of the periphery of the cavity being of U-shape and having a form corresponding to said style, inserting a core in the mold having an integral ridge around its rim with the ridge spaced from said portion of the periphery of the cavity, the ridge having dimensions corresponding to the band, casting a wax pattern in the mold cavity around the core, said pattern having an inside groove corresponding to the ridge, forming an investment mold around the wax pattern, melting the wax from the investment mold, casting a U-shaped metal shell in the investment mold, said shell incorporating said style and having a groove on the inside corresponding to the ridge, splitting the band and bending it to U-shape corresponding to the shape of the shell, fitting the band in the groove in the shell and bonding it to the shell in the groove, and bending the resultant shell-band assembly to ring shape and bonding its ends together.

3. The method of rebuilding a wedding band into a different style ring comprising the steps of turning the band to make it of uniform cross section throughout its extent, forming a master mold having a cavity therein, a portion of the periphery of the cavity being of U-shape and having a form corresponding to said style, inserting a core in the mold having an integral ridge around its rim with the ridge spaced from said portion of the periphery of the cavity, the cross section of the ridge corresponding to the cross section of the turned band, casting a wax pattern in the mold cavity around the core, said pattern having an inside groove corresponding to the ridge, forming an investment mold around the wax pattern, melting the wax from the investment mold, casting a U-shaped metal shell in the investment mold, said shell incorporating said style and having a groove on the inside corresponding to the ridge, splitting the turned band and bending it to U-shape corresponding to the shape of the shell, fitting the band in the groove in the shell and bonding it to the shell in the groove, and bending the resultant shell-band assembly to ring shape and bonding its ends together.

4. The method of rebuilding a wedding band which is of varying cross section throughout its extent into a different style ring comprising the steps of forming a master mold having a cavity therein, a portion of the periphery of the cavity being of U-shape and having a form corresponding to said style, splitting the band and bending it to U-shape, fitting the band on the rim of a core, inserting the core with the band thereon in the mold with the band spaced from the periphery of the cavity, casting a wax pattern in the mold cavity around the core and band, said pattern having an inside groove corresponding to the band, forming an investment mold around the wax pattern, melting the wax from the investment mold, casting a U-shaped metal shell in the investment mold, said shell incorporating said style and having a groove on the inside corresponding to the band, fitting the band in the groove in the shell and bonding it to the shell in the groove, and bending the resultant shell-band assembly to ring shape and bonding its ends together.

References Cited in the file of this patent

UNITED STATES PATENTS

| | | |
|---|---|---|
| 1,327,606 | Bacharach | Jan. 13, 1920 |
| 1,360,719 | Bross | Nov. 30, 1920 |
| 1,702,893 | Dinhofer | Feb. 19, 1929 |
| 1,947,254 | Foster | Feb. 13, 1934 |
| 2,113,442 | Eccles | Apr. 5, 1938 |
| 2,118,468 | Jungersen | May 24, 1938 |